(12) United States Patent
Kurdziel et al.

(10) Patent No.: US 12,242,661 B2
(45) Date of Patent: Mar. 4, 2025

(54) SYSTEM AND METHOD FOR OBFUSCATION OF SEQUENTIAL LOGIC THROUGH ENCRYPTION

(71) Applicant: Harris Global Communications, Inc., Rochester, NY (US)

(72) Inventors: Michael T. Kurdziel, Rochester, NY (US); Steven M. Farris, Webster, NY (US); Marcin Lukowiak, Rochester, NY (US); Stanislaw Radziszowski, West Henrietta, NY (US)

(73) Assignee: L3Harris Global Communications, Inc., Melbourne, FL (US)

( * ) Notice: Subject to any disclaimer, the term of this patent is extended or adjusted under 35 U.S.C. 154(b) by 323 days.

(21) Appl. No.: 17/865,519

(22) Filed: Jul. 15, 2022

(65) Prior Publication Data
US 2024/0020424 A1 Jan. 18, 2024

(51) Int. Cl.
*G06F 21/00* (2013.01)
*G06F 21/72* (2013.01)

(52) U.S. Cl.
CPC .................... *G06F 21/72* (2013.01)

(58) Field of Classification Search
CPC ........... G06F 21/72; G06F 21/76; G06F 21/75
See application file for complete search history.

(56) References Cited

U.S. PATENT DOCUMENTS

| 10,331,912 B2 | 6/2019 | Guilley et al. |
| 10,817,638 B2 | 10/2020 | Wang et al. |
| 11,061,997 B2 | 7/2021 | Parhi et al. |

(Continued)

FOREIGN PATENT DOCUMENTS

| EP | 3246832 | 11/2017 |
| WO | 2017218829 | 12/2017 |

(Continued)

OTHER PUBLICATIONS

Chakraborty and Bhunia, "Security against hardware trojan attacks using key-based design obfuscation," Journal of Electronic Testing, vol. 27, pp. 767-785 (2011).

(Continued)

*Primary Examiner* — Ghazal B Shehni
(74) *Attorney, Agent, or Firm* — Fox Rothschild LLP; Carol E. Thorstad-Forsyth

(57) ABSTRACT

Systems and methods for protecting intellectual property of a circuit via obfuscation of logic through encryption. The methods comprise: analyzing a combinational circuit (CC) to identify first logic gates that perform first function(s) which is(are) implementable by LUT(s); dividing CC a first portion comprising the first logic gates and a second portion comprising remaining logic gates; protecting gate logic of the first portion by at least storing information implementing the first function(s) in an encrypted LUT format in a memory device of the circuit such that the first function(s) is(are) obfuscated when the circuit is in an at-rest state; and interfacing the remaining logic gates with the memory device such that the circuit is configured to generate an output in accordance with operations of the combinational circuit using the information stored in the encrypted LUT format.

10 Claims, 9 Drawing Sheets

(56) References Cited

U.S. PATENT DOCUMENTS

| | | | |
|---|---|---|---|
| 2003/0068038 A1* | 4/2003 | Hanounik | H04L 9/0625 |
| | | | 380/37 |
| 2012/0278688 A1* | 11/2012 | Tsukamoto | G06F 11/10 |
| | | | 714/799 |
| 2018/0307848 A1 | 10/2018 | Leiseboer et al. | |
| 2019/0165935 A1 | 5/2019 | Tehranipoor et al. | |
| 2021/0064809 A1 | 3/2021 | Yanamadala et al. | |
| 2021/0081593 A1 | 3/2021 | Trujillo | |
| 2021/0173963 A1 | 6/2021 | Alaql et al. | |
| 2021/0192018 A1* | 6/2021 | Bhunia | G06F 21/76 |
| 2021/0192119 A1 | 6/2021 | Madani et al. | |
| 2021/0243041 A1 | 8/2021 | Schat | |
| 2021/0294953 A1* | 9/2021 | Dorairaj | G06F 30/392 |
| 2022/0027544 A1 | 1/2022 | Irissou et al. | |
| 2022/0035977 A1 | 2/2022 | Bhunia et al. | |
| 2022/0198108 A1 | 6/2022 | Bhunia et al. | |

FOREIGN PATENT DOCUMENTS

| | | |
|---|---|---|
| WO | 2021041793 | 3/2021 |
| WO | 2022017252 | 1/2022 |

OTHER PUBLICATIONS

Kohle and Mahmoodi, "On Custom LUT-based Obfuscation," Proceedings of the 2019 on Great Lakes Symposium on VLSI, pp. 477-482 (2019).

* cited by examiner

SYSTEM AND METHOD FOR OBFUSCATION OF SEQUENTIAL LOGIC THROUGH ENCRYPTION

BACKGROUND

Statement of the Technical Field

The present document concerns communication systems. More specifically, the present document concerns systems and methods for obfuscation of sequential logic through encryption.

Description of the Related Art

At different stages of an Integrated Circuit (IC) lifecycle, there are attacks which threaten to compromise the integrity of the design through piracy, reverse engineering, hardware Trojan insertion, side channel analysis, and other physical attacks. Some of the most notable challenges in this field deal specifically with Intellectual Property (IP) theft and reverse engineering attacks.

Protection of circuit designs that are deployed in Application Specific ICs (ASICs) rely on the physical protection of the device and the fact that reverse engineering is technically challenging and costly. This is intractable to most potential attackers.

Circuit designs that are deployed in Field Programmable Gate Arrays (FPGAs) are vulnerable. SRAM-based FPGA devices are secured by encrypting the bit stream that is loaded at power up to program the device. Anti-Fuse and FLASH-based FPGA devices are programmed at time of manufacture by loading a design image. Attacks which threaten these devices involve extraction of the design image from the actual device using proprietary techniques. Special consideration must be given to protect this design IP.

A technique used to protect hardware IP implemented in ASICs Flash-based FPGAs or any other digital circuit rendering against these threats is to obfuscate the implementation itself. This forces the necessary design analysis to become too expensive, in terms of either time or resources, for an adversary to realistically accomplish.

Some popular obfuscation methods for combinational logic include Netlist Logic Locking (NLL), Satisfiability (SAT) Attack Resistant logic Locking (SARLock), Strong Logic Locking (SLL), Anti-SAT, and Look Up Table Locking (LUT-Lock). These methods rely on inserting additional combinational logic (for example, XOR or XNOR gates) into a gate level netlist such that the original design function is obscured until a secret key is loaded. The gate level netlist comprises a list of logic gates in an electronic circuit and a description of connection between the logic gates. Additional logic gates and connections are added to the gate level netlist. These additional logic gates are referred to as keygates. The functionality of the electronic circuit is locked such that the electronic circuit is nonfunctional unless the secret key has been loaded. In the nonfunctional state, the electronic circuit produces incorrect outputs. The key supplies fixed logic levels to the added circuitry such that only the correct inputs result in a properly functioning circuit design. The logic locking based obfuscation methods are vulnerable to attacks such as key-pruning attacks.

For obfuscation of sequential circuits, various methods have been proposed. For example, one popular method uses a separate and isolated "obfuscated state space" that locks the proper functionality of the design behind a key sequence. The main utility of this technique is to protect against hardware Trojan insertion. Trojan inserted into the incorrect state space would be rendered benign.

SUMMARY

This document concerns systems and methods for protecting intellectual property of a circuit via obfuscation of logic through encryption. The methods comprise: analyzing a combinational circuit to identify first logic gates of a plurality of logic gates that perform at least one first function of a plurality of functions which is implementable by at least one look-up table; dividing the combinational circuit into a first portion comprising the first logic gates which were identified and a second portion comprising remaining logic gates of the plurality of logic gates; protecting gate logic of the first portion by removing the first logic gates from the plurality of logic gates and storing information implementing the at least one first function in an encrypted look-up table format in a memory device of the circuit such that the at least one first function is obfuscated when the circuit is in an at-rest state; and interfacing the remaining logic gates with the memory device such that the circuit is configured to generate an output in accordance with operations of the combinational circuit using the information stored in the encrypted look-up table format.

The first logic gates may be identified based on (i) whether performance of the first logic gates is not impacted by being represented in a look-up table form and (ii) whether the first logic gates comprise enough logic gates so that the at least one first function is unable to be determined from the remaining logic gates of the plurality of logic gates when the circuit is in the at-rest state.

In some scenarios, the methods also comprise: enabling operation of the circuit; decrypting at least a portion of the information to produce decrypted information in response to the enablement of the circuit or a transition of the circuit from the at-rest state; using, by the remaining logic gates of the second portion, the decrypted information to generate the output in accordance with operations of the combinational circuit. The output may be a function of present input values only, or alternatively a function of present input values and a history of inputs. The history of inputs may be maintained using a state memory acting as a Moore state machine or a Mealy state machine.

The decrypted information may be removed from the circuit upon detection of a trigger event. The trigger event can include, but is not limited to, expiration of a period of time indicating that the decrypted information is no longer being used by the remaining logic gates, a specified time, and/or issuance of a command to power off of the circuit.

The present document also concerns a circuit. The circuit comprises: a plurality of logic gates implementing a first portion of a combinational circuit; a memory device comprising first information implementing a second portion of the combinational circuit, the first information being stored in an encrypted look-up table format and protecting gate logic of the second portion from being determined from the plurality of logic gates; and a processor configured to (i) generate second information by decrypting at least a portion of the first information when the circuit is enabled, (ii) cause the plurality of logic gates to use the second information to generate at least one output in accordance with operations of the combinational circuit, and (ii) remove the second information from the circuit upon detection of a trigger event. Functions of the second portion of the combinational circuit are obfuscated when the circuit is in an at-rest state. The second portion's performance is not impacted by representing logic gates thereof in the encrypted look-up table format. The second portion comprises enough logic gates so that functions thereof are unable to be determined from the plurality of logic gates of the first portion when the circuit is in the at-rest state.

The processor is also configured to decrypt at least a portion of the information to produce decrypted information in response to an enablement of the circuit or a transition of the circuit from the at-rest state. The logic gates of the first portion are configured to generate the at least one output using the decrypted information in accordance with operations of the combinational circuit. The output(s) is(are) a function of present input values only, or alternatively a function of present input values and a history of inputs. The history of inputs is maintained in a state memory acting as a Moore state machine or a Mealy state machine.

The processor is further configured to cause removal of the decrypted information from the circuit upon detection of a trigger event. The trigger event includes, but is not limited to, expiration of a period of time indicating that the decrypted information is no longer being used by the remaining logic gates, a specified time, and/or issuance of a command to power off of the circuit.

BRIEF DESCRIPTION OF THE DRAWINGS

This disclosure is facilitated by reference to the following drawing figures, in which like numerals represent like items throughout the figures.

DETAILED DESCRIPTION

Figure 1:
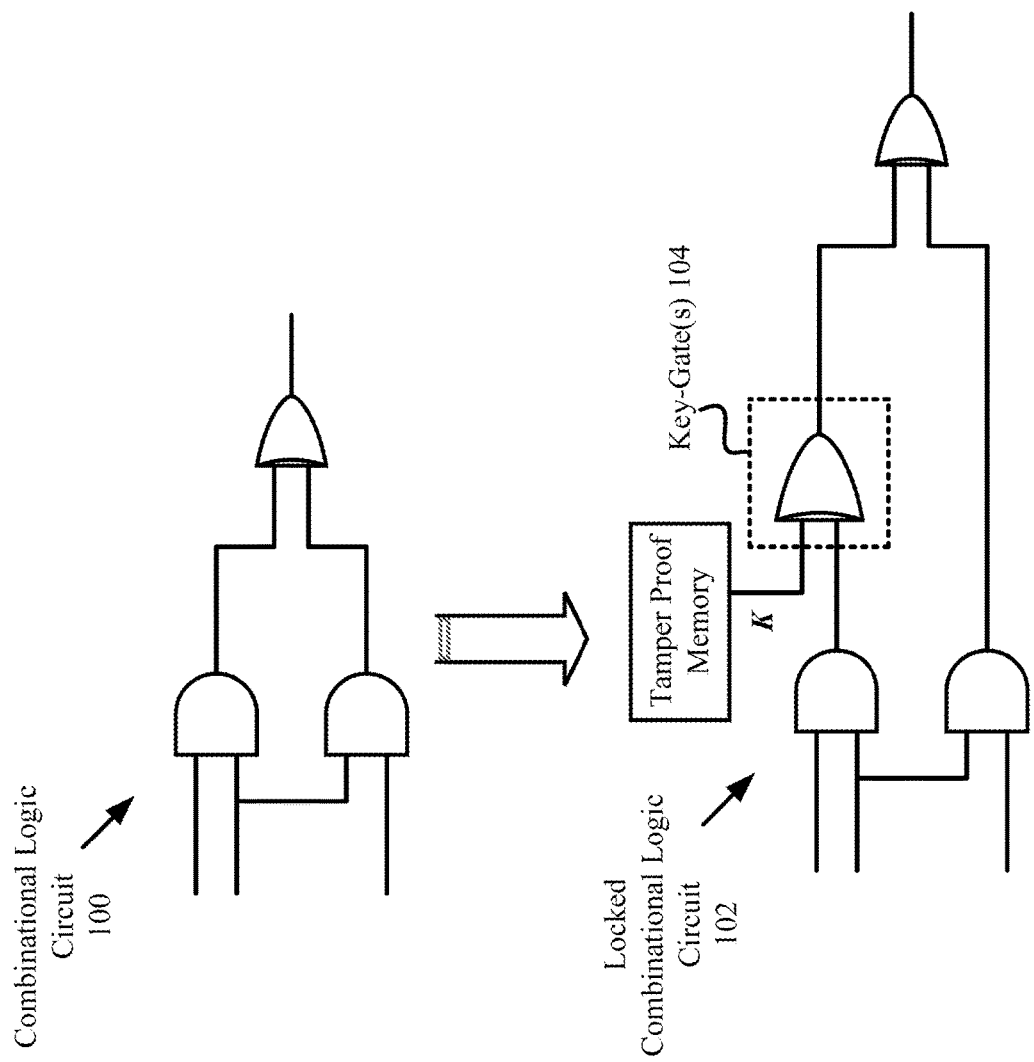
FIG. 1 provides an illustration showing a combinational logic circuit and a locked combinational logic circuit.

It will be readily understood that the solution described herein and illustrated in the appended figures could involve a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

Reference throughout this specification to features, advantages, or similar language does not imply that all of the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

The term "netlist" as used herein refers to a list of electronic components of an electronic circuit and a description of connection between the electronic components.

The term "combinational logic" refers to a digital logic function made of logic gates (AND, NAND, OR, NOR, NOT, etc.) in which the output is a function of the present input values only. Combinational logic circuits do not have memory. An illustrative combinational logic circuit 100 is provided in FIG. 1.

The term "logic locking" refers to the addition of logic gates and connections to a netlist for an electronic circuit. These additional logic gates are referred to as key-gates. The functionality of the electronic circuit is locked such that the electronic circuit is nonfunctional unless the secret key has been loaded. In the nonfunctional state, the electronic circuit produces incorrect outputs. The key supplies fixed logic levels to the added circuitry such that only the correct inputs result in a properly functioning circuit design. An illustration of a locked combinational logic circuit 102 is also provided in FIG. 1 in which key-gate(s) 104 have been added along with a tamper proof memory. The combinational logic circuit functions property when the correct key value(s) K is provided to the key-gate(s). K can include one or more digits. Each digit of K can have a "0" value or a "1" value.

Figure 2:
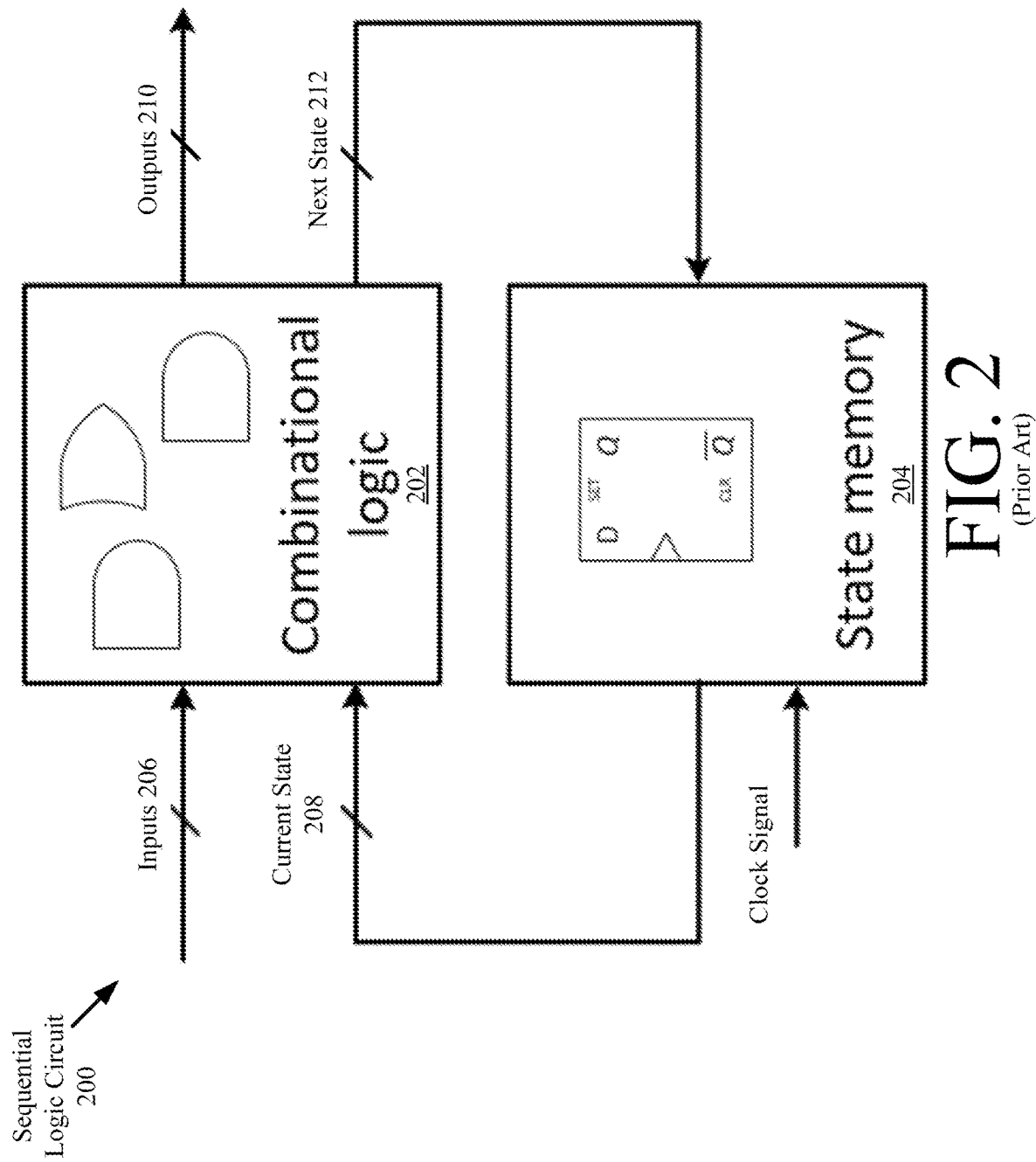
FIG. 2 provides an illustration of a sequential logic circuit.

The term "sequential logic" refers to a digital logic function made of logic gates in which the output is a function of the present input values and the history of inputs. An illustration of a clocked sequential logic circuit 200 is provided in FIG. 2. The sequential logic circuit 200 has combinational logic 202 and state memory 204. The combinational logic 202 calculates outputs 210 and a next state 212 based on inputs 206 and a current state 208. The state memory 204 is a clocked memory component used to remember the current state 208. The state memory 204 can include, but is not limited to, flit-flop circuit(s). A flip-flop circuit has two stable states that can be used to store binary data.

Figure 3:
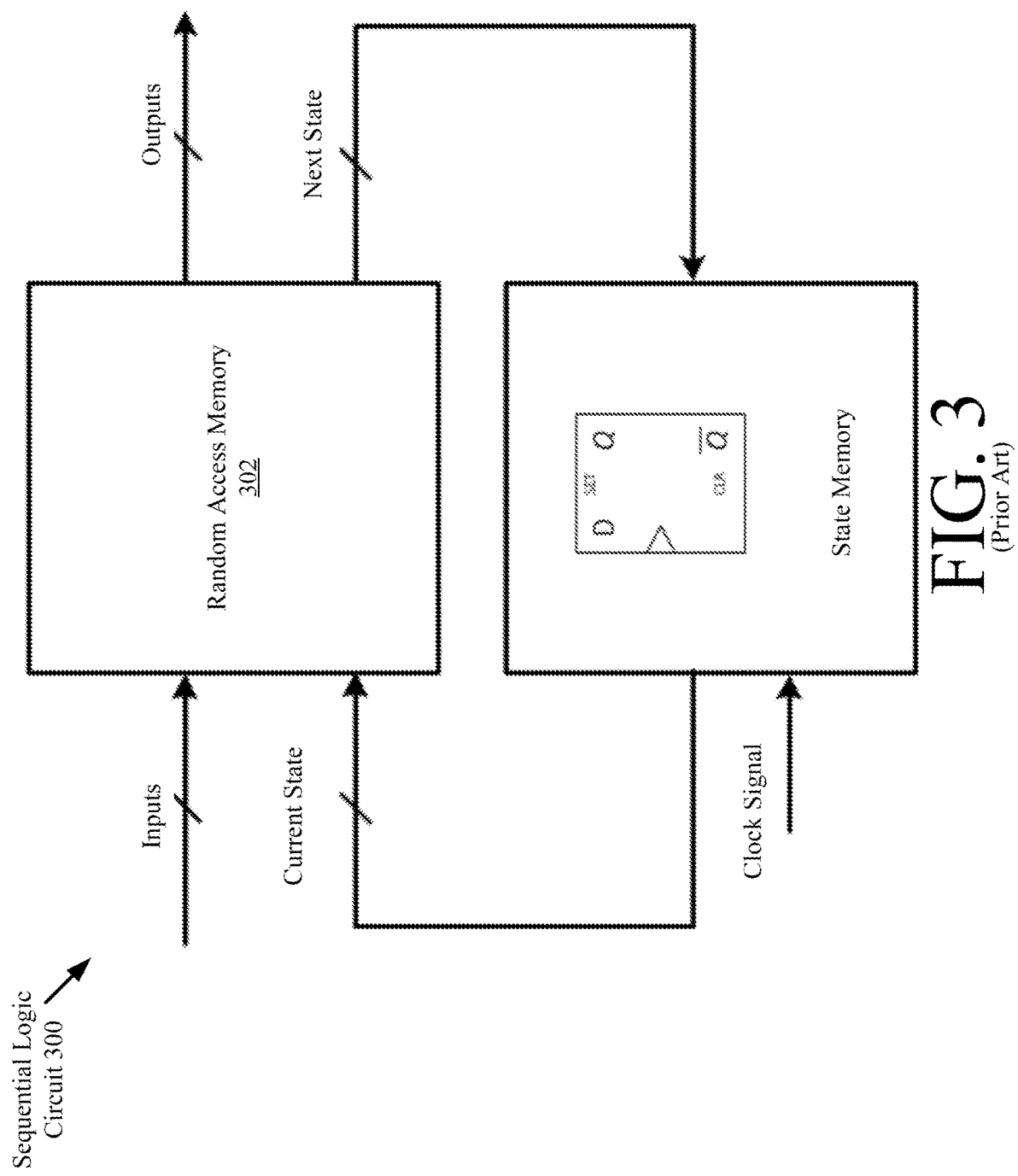
FIG. 3 provides an illustration of a variant of a sequential logic circuit.

A variant of a sequential logic circuit 300 is shown in FIG. 3. The sequential logic circuit 300 comprises Random Access Memory (RAM) 302 instead of combinational logic. The functionality of sequential logic circuit 300 may be the same as or similar to sequential logic circuit 200. However, the combinational logic of the circuit is implemented using memory acting as an LUT.

A new technique is presented herein for obfuscating combinational logic designs. The present solution can be used, for example, in anti-fuse FPGAs, Flash-based FPGAs Static Random-Access Memory (SRAM) based FPGAs, ASICs and/or any other digital circuit rendering. Combinational logic is separated into encrypted-logic and in-scope-logic. The encrypted-logic begins with a portion of combinational logic that is identified to be implemented as LUT(s). The LUT(s) is(are) stored in on-chip encrypted memory. Therefore, the at-rest state of the design shows in-scope-logic and not encrypted-logic.

Figure 4:
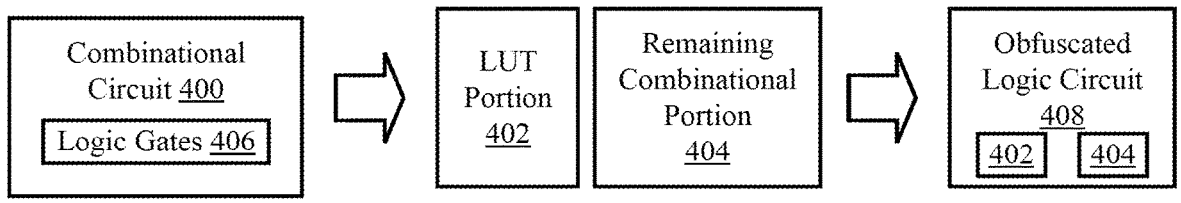
FIG. 4 provides an illustration that is useful for understanding the present solution.

Referring now to FIG. 4, there is provided an illustration that is useful for understanding the present solution. First, a combinational circuit 400 is designed. The combinational circuit 400 comprises a plurality of logic gates which are connected to each other. The combinational circuit 400 is then analyzed to identify logic gates with functions that can be implemented by LUT(s). This identification can be made based on certain criteria such that (i) performance of a portion of the logic circuit is not impacted by being represented in an LUT form and (ii) enough logic gates will be represented in an LUT form so that the function thereof cannot be determined from the remaining logic gates when the circuit is in the at-rest state. The term "at-rest state" refers to a state of inactivity and inoperativeness. The circuit may be, for example, in its at-rest state when power is not being supplied thereto and/or data is not being accesses or used. Thereafter, the combinational circuit 400 is split or otherwise divided into two portions: an LUT portion 402 and a remaining combinational portion 404. Next, an obfuscated logic circuit 408 is designed using the LUT portion 402 and a remaining combinational portion 404. The LUT portion 402 is implemented as encrypted LUT(s) in a memory device. The remaining combinational portion 404 is implemented as logic gates.

Figure 5:
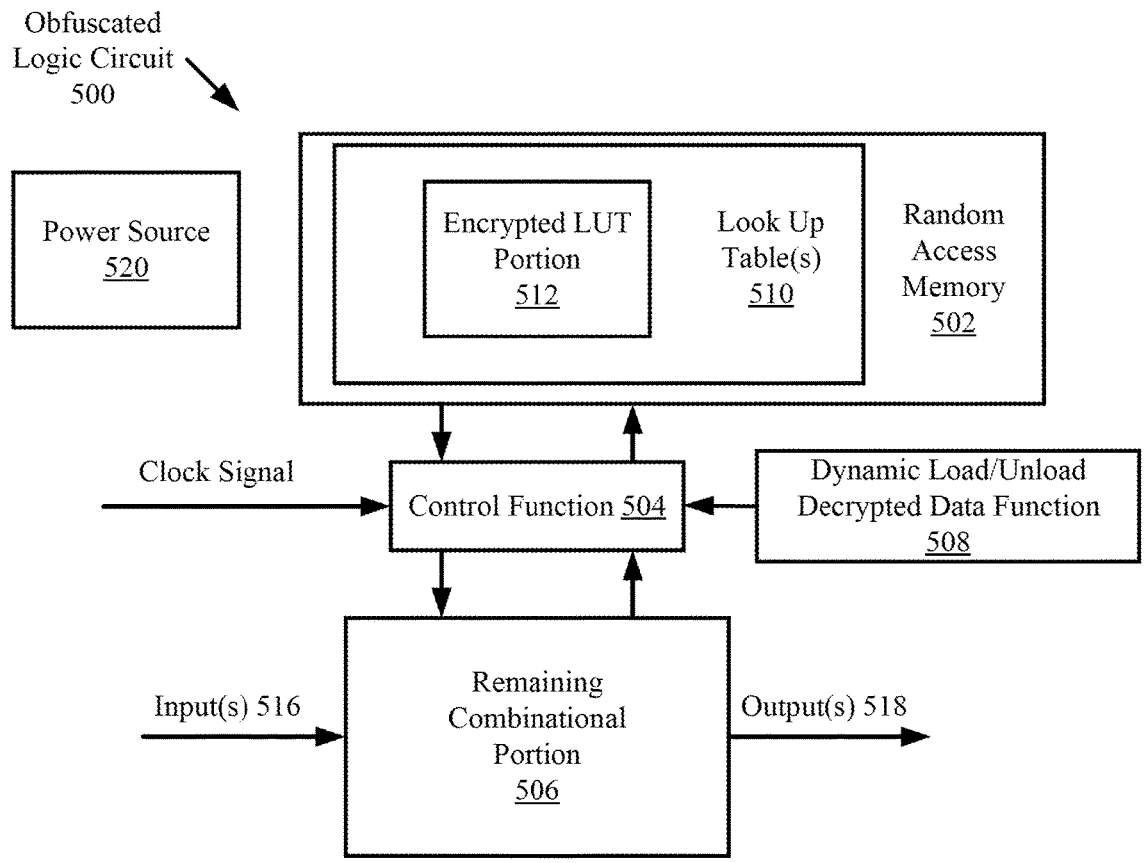
FIG. 5 provides an illustration of an obfuscated logic circuit.

FIG. 5 provides an illustration of an obfuscated logic circuit 500. Obfuscated logic circuit 500 comprises a RAM 502, a control function 504, and a remaining combinational portion 506. An encrypted LUT portion 512 is stored in RAM 502 as one or more LUTs 510. Encrypted LUT portion 512 is configured to protect gate logic IP by keeping it encrypted in RAM 822 when not in use. The cryptographic algorithm can include, but is not limited to, the Advanced Encryption Standard (AES) based algorithm.

The obfuscated logic circuit 500 can be enabled via an application of power from a power source 520. Output(s) 518 of the obfuscated logic circuit 500 is(are) a function of the present input(s) 516 only. The outputs 518 are generated by the remaining combinational portion 506 which comprises logic gates (AND, NAND, OR, NOR, NOT, etc.) connected to each other so as to form a combinational circuit.

Figure 6:
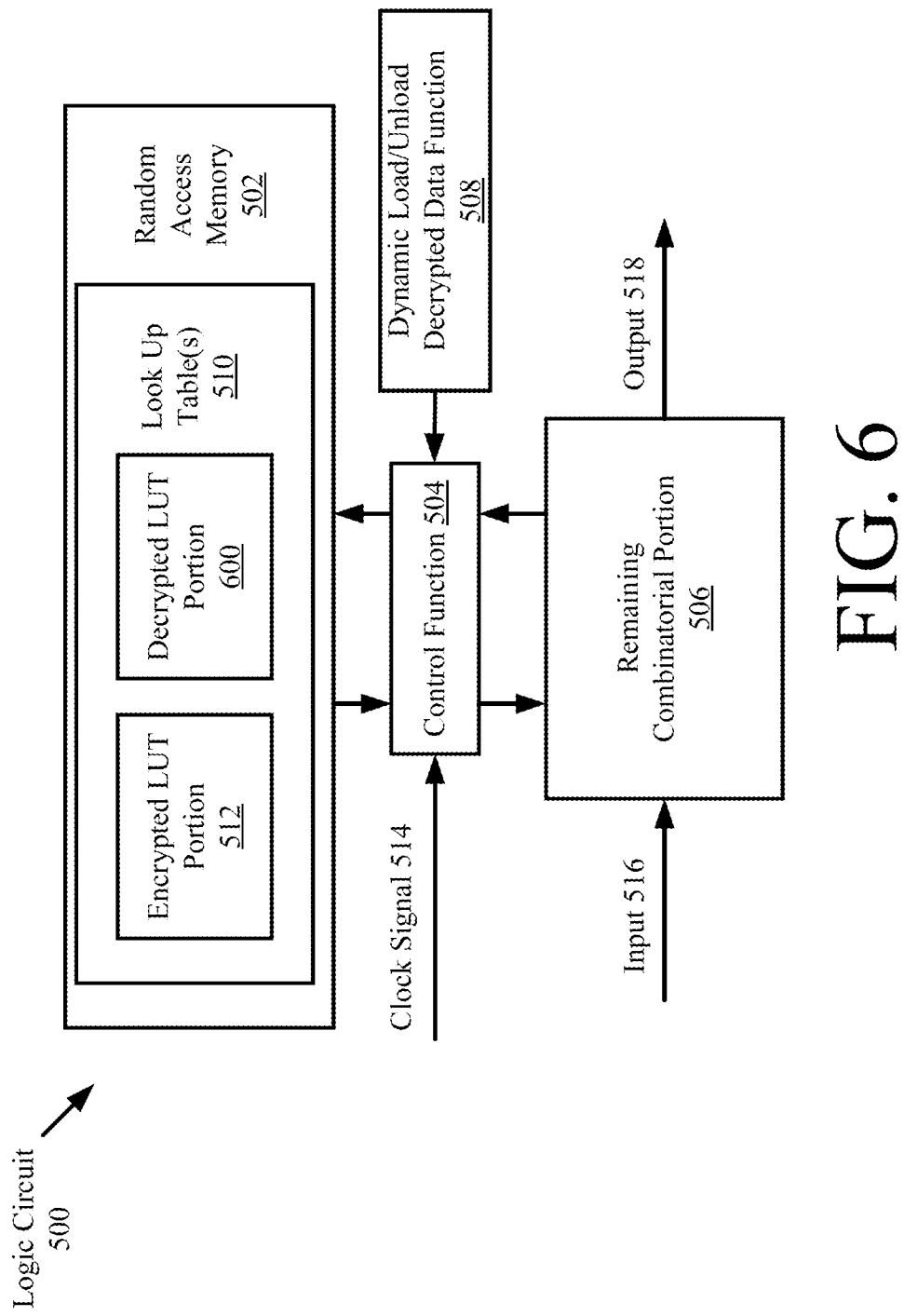
FIGS. 6-7 provide illustrations that are useful for understanding operations of the obfuscated logic circuit shown in FIG. 5.
Figure 7:
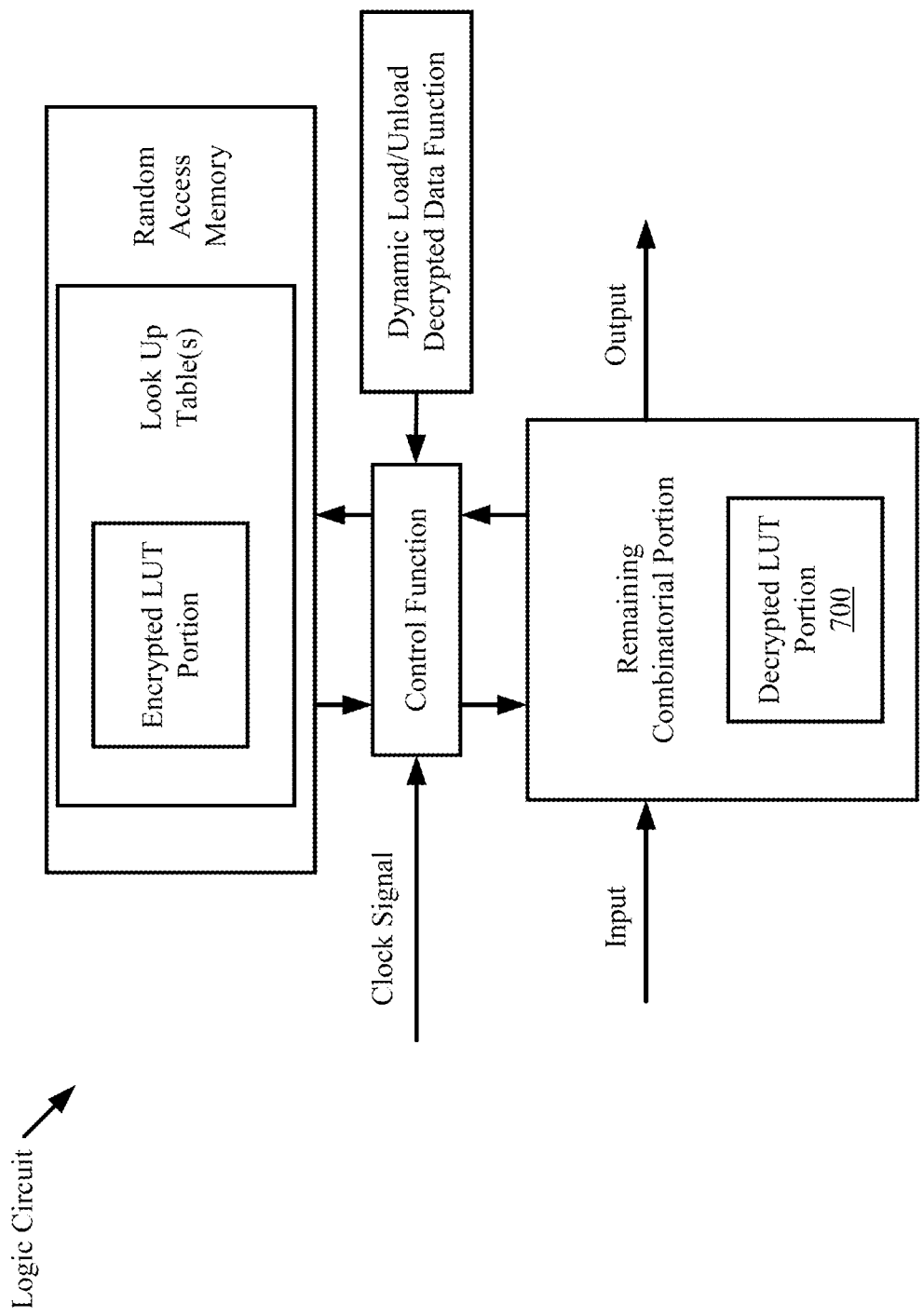

When the circuit is enabled, a control function 504 is performed to interface the remaining combinational portion 506 with an encrypted LUT portion 512 stored in the RAM 502. In this regard, a control function 504 is performed to access and decrypt all or a portion of the encrypted LUT portion 512. These operations can be performed automatically in response to a supply of power to the obfuscated logic circuit 500 or in response to a request for specific LUT information from the remaining combinational portion 506. The decrypted LUT portion and the remaining combinational portion 506 collectively implement the functionality of the original combinational circuit (e.g., combinational circuit 400 of FIG. 4). The decrypted LUT portion may be at least partially temporarily stored in the RAM 502 as shown by block 600 of FIG. 6 and/or downloaded into the remaining combinatorial portion as shown by block 700 of FIG. 7.

The decrypted LUT portion can be erased from memory and/or unloaded from the remaining combinational portion, in response to trigger events detected by a Dynamic Load/Unload Decrypted Data (DLUDD) function 508. The trigger events can include, but are not limited to, expiration of a period of time indicating that the decrypted information is not being used by the remaining combinational portion, specified times, and/or issuance of a command to power off of the circuit 500.

Figure 8:
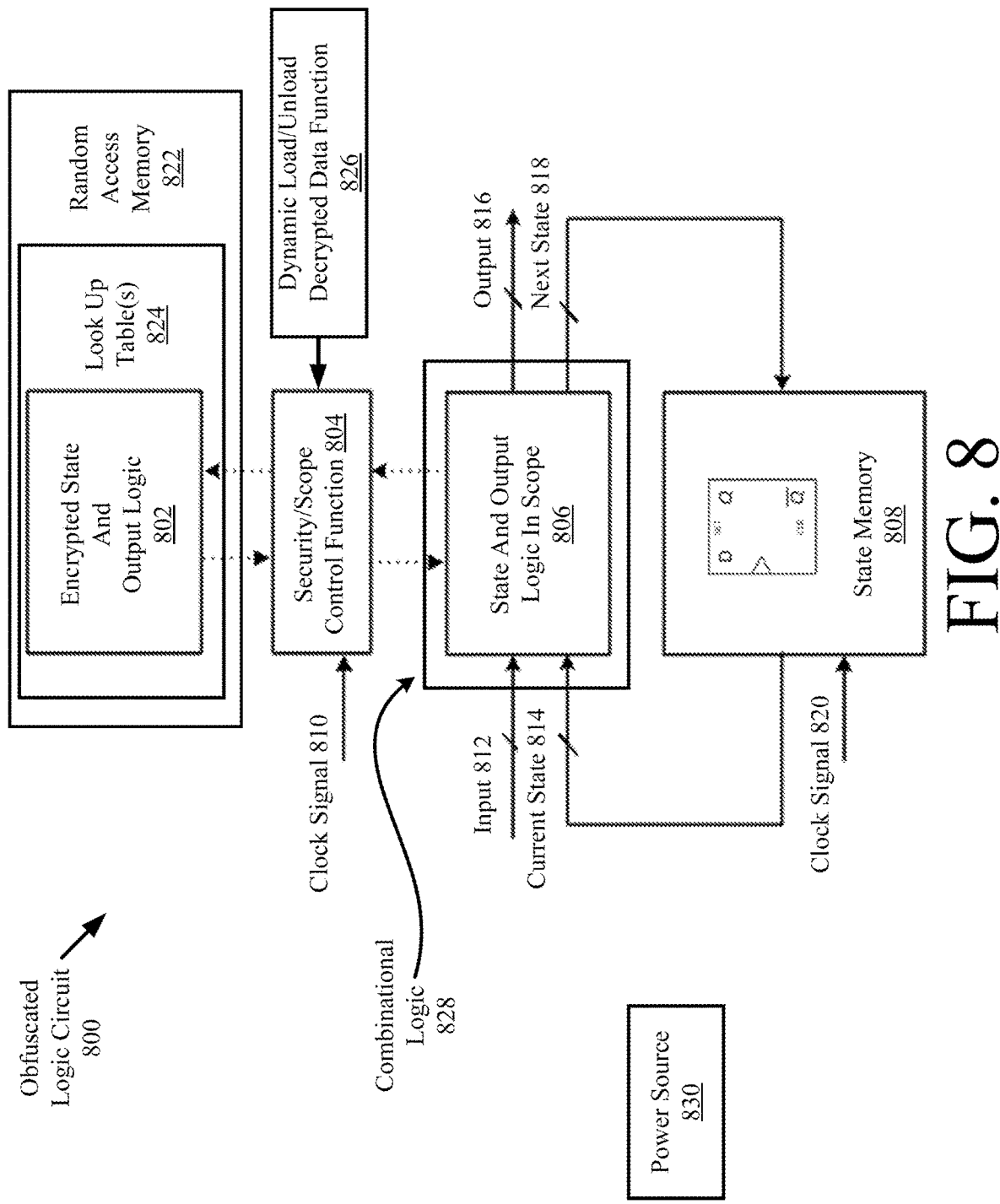
FIG. 8 provides an illustration of another obfuscated logic circuit.

Referring now to FIG. 8, there is provided an illustration of another obfuscated logic circuit 800 implementing the present solution. Logic circuit 800 comprises RAM 822, Output Logic in Scope (SOLiS) 806 and state memory 808. Functions of an Encrypted State and Output Logic (ESOL) 802 are implemented as one or more LUTs 824 stored in RAM 822. ESOL 302 is configured to protect gate logic IP by keeping it encrypted in RAM 822 using a cryptographic algorithm. The cryptographic algorithm can include, but is not limited to, an AES based algorithm. ESOL 802 implements a portion of a combinational circuit (for example, combinational circuit 400 of FIG. 4) which was identified as having functionality implementable by LUTs (for example, LUT portion 402 of FIG. 4). SOLiS 806 comprises a remaining portion of the combinational circuit (for example, remaining combinational portion 404 of FIG. 4). The remaining portion is implemented by logic gates (AND, NAND, OR, NOR, NOT, etc.).

The obfuscated logic circuit 800 can be enabled via an application of power from a power source 830. Output(s) 816 of the logic circuit 800 is(are) function(s) of the present input(s) 812 and the history of inputs. The output(s) 816 is(are) generated by SOLiS 806 which comprises logic gates connected to each other so as to form a combinational circuit. SOLiS 806 calculates output(s) 816 based on input(s) 812 and a current state 814. SOLiS 806 also calculates a next state 818 based on input(s) 812, the current state 814 and/or output(s) 816. The next state 818 is passed to the state memory 808.

State memory 204 is a clocked memory component used to remember the current state 208. State memory 808 may comprise a Moore state machine or a Mealy state machine. Moore and Mealy state machines are well known. The Moore state machine computes the current state based on input(s) (via next state 818) and the previous state. The Mealy state machine computes the current state based on input(s)/output(s) (via next state 818) and the previous state. The Moore and/or Mealy state machines can be implemented via flip-flops.

When the circuit is enabled, a Security/Scope Control (SSC) function 804 is performed to interface SOLiS 806 with ESOL 802. In this regard, the control function 504 causes the system to access and decrypt all or a portion of ESOL 802. These operations can be performed automatically in response to a supply of power to the obfuscated logic circuit 800 or in response to a request for specific LUT information from SOLiS 806. The decrypted ESOL information and SOLiS 806 collectively implement the functionality of the original combinational circuit (for example, combinational circuit 400 of FIG. 4). The decrypted ESOL information may be at least partially temporarily stored in the RAM 822 and/or downloaded into SOLiS 806.

The decrypted ESOL information can be erased from RAM 822 and/or unloaded from SOLiS 806, in response to trigger events detected by a DLUDD function 826. The trigger events can include, but are not limited to, expiration of a period of time indicating that the decrypted information is not being used by the remaining combinational portion, specified times, and/or issuance of a command to power off or otherwise disable the circuit 800.

Figure 9:
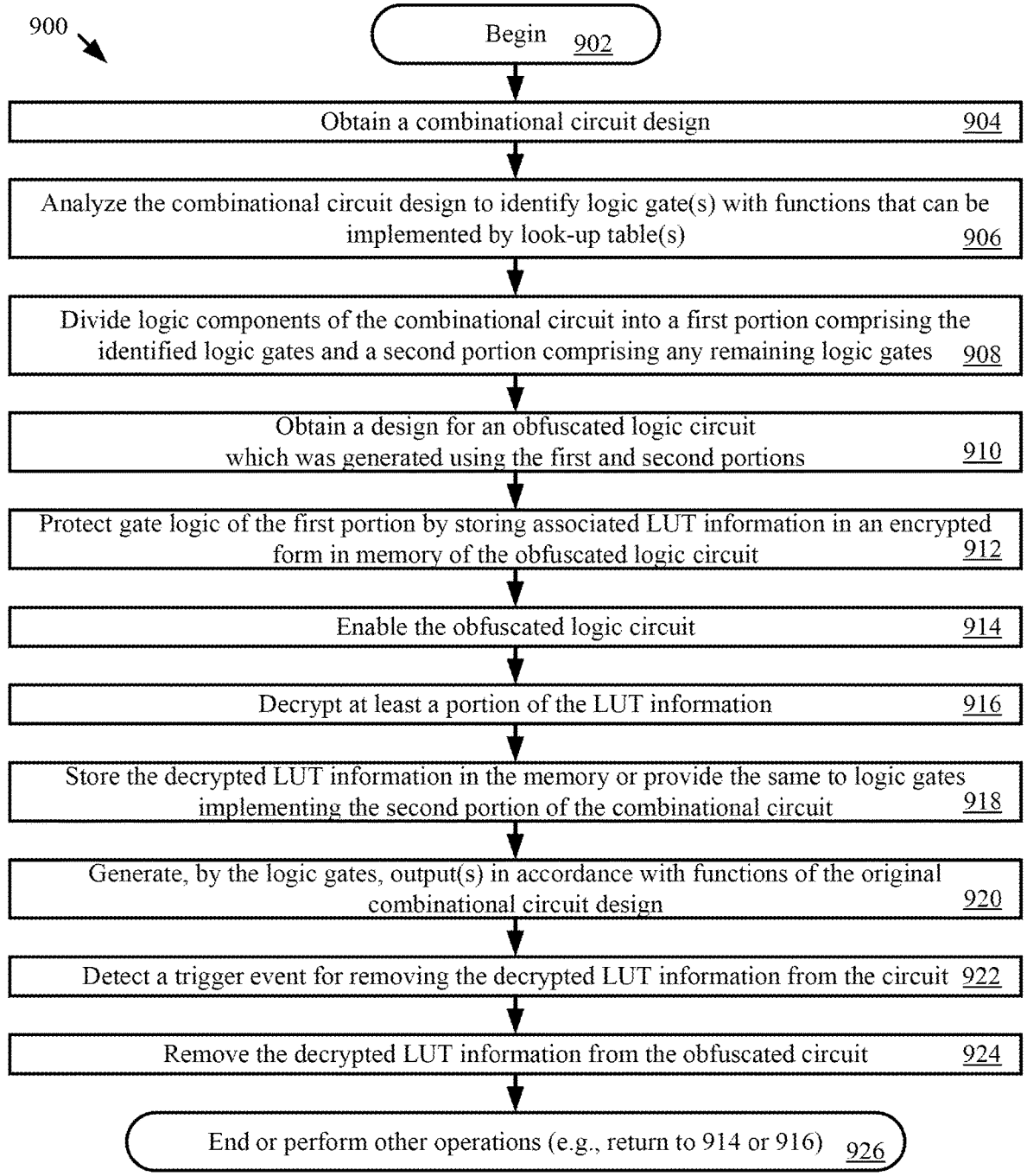
FIG. 9 provides a flow diagram of an illustrative method for protecting intellectual property of a circuit. This protection is provided via obfuscation of sequential logic through encryption.

Referring now to FIG. 9, there is provided a flow diagram of an illustrative method 900 for protecting intellectual property of a circuit. This protection is provided via obfuscation of sequential logic through encryption. Method 900 begins with 902 and continues with 904 where a design for a combinational circuit (for example, combinational circuit 400 of FIG. 4) is obtained. The combinational circuit comprises a plurality of logic gates (for example, logic gates 406 of FIG. 4) which are connected to each other so as to implement function(s).

The combinational circuit is then analyzed in 906 to identify logic gates with functions that can be implemented by LUT(s). This identification can be made based on certain criteria such that (i) performance of a portion of the logic circuit is not impacted by being represented in an LUT form and (ii) enough logic gates will be represented in an LUT form so that the function(s) thereof cannot be determined from the remaining logic gates. This analysis can be performed manually by individual(s) or automatically by a computing device. The computing device may employ machine learning model(s) trained to identify portions of combinational circuits with function(s) that can be implemented via LUTs without an ability of being determined from a remaining portion of the combinational circuit.

In 908, the logic components of the combinational circuit are split or otherwise divided into two portions: a first portion (for example, LUT portion 402 of FIG. 4 or ESOL 802 of FIG. 8) and a second portion (for example, remaining combinational portion 404 of FIG. 4 or SOLiS 806 of FIG. 8). The first portion comprises the logic gates which were identified in 906, and the second portion comprises any remaining logic gates of the combinational circuit. A design for an obfuscated logic circuit (for example, obfuscated logic circuit 500 of FIG. 5 or 800 of FIG. 8) is then obtained in 910. The obfuscated logic circuit is generated using the first and second portions manually by individual(s) or automatedly by the computing device in accordance with predefined circuit design rules and/or circuit simulation result(s). Gate logic of the first portion is protected by having its associated LUT information being stored in an encrypted format within memory (for example, RAM 502 of FIG. 5 or 822 of FIG. 8) of the obfuscated logic circuit, as shown by 912. Any type of encryption can be used here.

Thereafter in 914, the obfuscated logic circuit is enabled, for example, by causing power to be supplied thereto from a power source (for example, power source 520 of FIG. 5 or 830 of FIG. 8). A control function (for example, control function 504 of FIG. 5 or SSC function 804 of FIG. 8) is performed in 916 whereby at least a portion of the LUT information is decrypted. The decrypted LUT information is stored in memory or provided to the logic gates implementing the second portion of the combinational circuit, as shown by 918. The logic gates then generate output(s) (for example, output(s) 518 of FIG. 5 or 816 of FIG. 8) in accordance with functions of the original combinational circuit design (for example, combinational circuit 400 of FIG. 4).

A trigger event may be detected in 922 by a DLUDD function (for example, DLUDD function 508 of FIG. 5 or 826 of FIG. 8) of the obfuscated logic circuit. The trigger event can include, but is not limited to, expiration of a period of time indicating that the decrypted information is not being used by the remaining combinational portion, specified times, and/or issuance of a command to power off of the circuit. In response to detection of the trigger event, the decrypted LUT information is removed from the obfuscated logic circuit as shown by 924. Subsequently, 926 is performed where method 900 ends or other operations are performed (for example, return to 914 or 916).

The present solution has many novel features. For example, the present solution allows: obfuscation of combinatorial logic, in general, and sequential circuits in antifuse, FLASH SRAM FPGAs or any other digital circuit rendering; complete removal of the initialization state machine after initialization is complete; complete removal of logic if is not in scope; and/or complete removal of logic if it is no longer needed (e.g. for customization that is done once).

Figure 10:
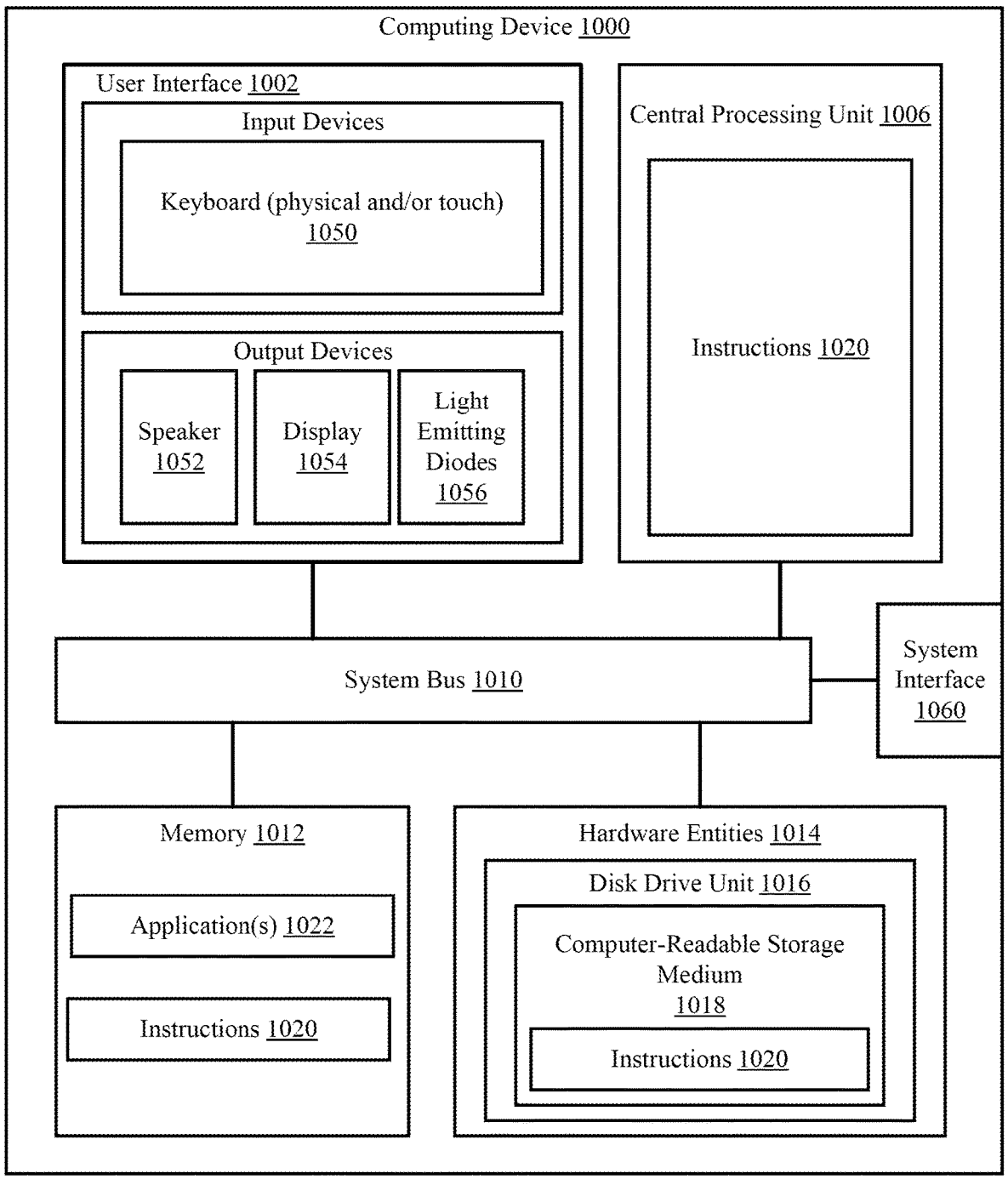
FIG. 10 provides an illustration of a computing device.

FIG. 10 provides an illustration of an architecture for a computing device 1000. Obfuscated logic circuits 500, 800 may be implemented by one or more computing device(s) 1000. For example, control function 504 of FIG. 5, DLUDD function 508 of FIG. 5, SSC function 804 of FIG. 8 and/or DLUDD function 826 of FIG. 8 may be implemented by a processor of the computing device 1000. LUT(s) can be stored in a memory of the computing device 1000.

Computing device 1000 may include more or less components than those shown in FIG. 10. However, the components shown are sufficient to disclose an illustrative solution implementing the present solution. The hardware architecture of FIG. 10 represents one implementation of a representative computing device configured to provide improved security to computational circuit and/or sequential circuits, as described herein. As such, the computing device 1000 of FIG. 10 implements at least a portion of the method(s) described herein.

Some or all components of the computing device 1000 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers, microprocessors and logic gates). The passive and/or active components can be adapted to, arranged to and/or programmed to perform one or more of the methodologies, procedures, or functions described herein.

As shown in FIG. 10, the computing device 1000 comprises a user interface 1002, a Central Processing Unit (CPU) 1006, a system bus 1010, a memory 1012 connected to and accessible by other portions of computing device 1000 through system bus 1010, a system interface 1060, and hardware entities 1014 connected to system bus 1010. The user interface can include input devices and output devices, which facilitate user-software interactions for controlling operations of the computing device 1000. The input devices include, but are not limited, a physical and/or touch keyboard 1050. The input devices can be connected to the computing device 1000 via a wired or wireless connection (e.g., a Bluetooth® connection). The output devices include, but are not limited to, a speaker 1052, a display 1054, and/or light emitting diodes 1056. System interface 1060 is configured to facilitate wired or wireless communications to and from external devices (e.g., network nodes such as access points, etc.).

At least some of the hardware entities 1014 perform actions involving access to and use of memory 1012, which can be RAM, a solid-state or disk driver and/or a Compact Disc Read Only Memory (CD-ROM). Hardware entities 1014 can include a disk drive unit 1016 comprising a computer-readable storage medium 1018 on which is stored one or more sets of instructions 1020 (e.g., software code) configured to implement one or more of the methodologies, procedures, or functions described herein. The instructions 1020 can also reside, completely or at least partially, within the memory 1012 and/or within the CPU 1006 during execution thereof by the computing device 1000. The memory 1012 and the CPU 1006 also can constitute machine-readable media. The term "machine-readable media", as used here, refers to a single medium or multiple media (e.g., a centralized or distributed database, and/or associated caches and servers) that store the one or more sets of instructions 1020. The term "machine-readable media", as used here, also refers to any medium that is capable of storing, encoding or carrying a set of instructions 1020 for execution by the computing device 1000 and that cause the computing device 1000 to perform any one or more of the methodologies of the present disclosure.

As evidenced from the above discussion, the present solution concerns implementing systems and methods for protecting intellectual property of a circuit via obfuscation of logic through encryption. In some scenarios, the methods comprise: analyzing a combinational circuit to identify first logic gates of a plurality of logic gates that perform at least one first function of a plurality of functions which is implementable by at least one look-up table; dividing the combinational circuit into a first portion comprising the first logic gates which were identified and a second portion comprising remaining logic gates of the plurality of logic gates; protecting gate logic of the first portion by removing the first logic gates from the plurality of logic gates and storing information implementing the at least one first function in an encrypted look-up table format in a memory device of the circuit such that the at least one first function is obfuscated when the circuit is in an at-rest state; and interfacing the remaining logic gates with the memory device such that the circuit is configured to generate an output in accordance with operations of the combinational circuit using the information stored in the encrypted look-up table format.

The first logic gates may be identified based on (i) whether performance of the first logic gates is not impacted by being represented in a look-up table form and (ii) whether the first logic gates comprise enough logic gates so that the at least one first function is unable to be determined from the remaining logic gates of the plurality of logic gates when the circuit is in the at-rest state.

The methods may also comprise: enabling operation of the circuit; decrypting at least a portion of the information to produce decrypted information in response to the enablement of the circuit or a transition of the circuit from the at-rest state; using, by the remaining logic gates of the second portion, the decrypted information to generate the output in accordance with operations of the combinational circuit. The output may be a function of present input values only, or alternatively a function of present input values and a history of inputs. The history of inputs may be maintained using a state memory acting as a Moore state machine or a Mealy state machine.

The decrypted information may be removed from the circuit upon detection of a trigger event. The trigger event can include, but is not limited to, expiration of a period of time indicating that the decrypted information is no longer being used by the remaining logic gates, a specified time, and/or issuance of a command to power off of the circuit.

The present solution also concerns a circuit. The circuit may comprise: a plurality of logic gates implementing a first portion of a combinational circuit; a memory device comprising first information implementing a second portion of the combinational circuit, the first information being stored in an encrypted look-up table format and protecting gate logic of the second portion from being determined from the plurality of logic gates; and a processor configured to (i) generate second information by decrypting at least a portion of the first information when the circuit is enabled, (ii) cause the plurality of logic gates to use the second information to generate at least one output in accordance with operations of the combinational circuit, and (ii) remove the second information from the circuit upon detection of a trigger event. Functions of the second portion of the combinational circuit are obfuscated when the circuit is in an at-rest state. The second portion's performance is not impacted by representing logic gates thereof in the encrypted look-up table format. The second portion comprises enough logic gates so that functions thereof are unable to be determined from the plurality of logic gates of the first portion when the circuit is in the at-rest state.

The processor may also be configured to decrypt at least a portion of the information to produce decrypted information in response to an enablement of the circuit or a transition of the circuit from the at-rest state. The logic gates of the first portion are configured to generate the at least one output using the decrypted information in accordance with operations of the combinational circuit. The output(s) is(are) a function of present input values only, or alternatively a function of present input values and a history of inputs. The history of inputs is maintained in a state memory acting as a Moore state machine or a Mealy state machine.

The processor may further configured to cause removal of the decrypted information from the circuit upon detection of a trigger event. The trigger event includes, but is not limited to, expiration of a period of time indicating that the decrypted information is no longer being used by the remaining logic gates, a specified time, and/or issuance of a command to power off of the circuit.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A circuit, comprising:
   a plurality of first logic gates implementing a first portion of a combinational circuit;
   a memory device storing an encrypted look-up table portion comprising first information implementing gate logic of a plurality of second logic gates of a second portion of the combinational circuit, the first information being stored in an encrypted look-up table format and protecting the gate logic of the plurality of second logic gates from being determined from the plurality of first logic gates; and
   a processor configured to (i) generate a decrypted look-up table portion comprising second information by decrypting at least a portion of the first information when the circuit is enabled, (ii) cause the plurality of first logic gates to use the second information to generate at least one output in accordance with operations of the combinational circuit, and (ii) remove the decrypted look-up table portion from the circuit upon detection of a trigger event;

wherein functions of the second portion of the combinational circuit are obfuscated when the circuit is in an at-rest state;

wherein the first information implementing the gate logic of the plurality of second logic gates is (i) only stored by the circuit in the encrypted look-up table format when the first information is not in use by the circuit, and (ii) at least partially stored by the circuit in the encrypted look-up table format and at least partially stored by the circuit in a decrypted look-up table format when the first information is in use by the circuit.

2. The circuit according to claim 1, wherein the second portion's performance is not impacted by representing the second logic gates thereof in the encrypted look-up table format and the second portion comprise enough second logic gates so that functions thereof are unable to be determined from the plurality of first logic gates of the first portion when the circuit is in the at-rest state.

3. The circuit according to claim 1, wherein the processor is further configured to decrypt at least a portion of the first information to produce decrypted information in response to an enablement of the circuit or a transition of the circuit from the at-rest state.

4. The circuit according to claim 3, wherein the plurality of first logic gates of the first portion are configured to generate the at least one output using the decrypted information in accordance with operations of the combinational circuit.

5. The circuit according to claim 4, wherein the at least one output is a function of present input values only.

6. The circuit according to claim 4, wherein the at least one output is a function of present input values and a history of inputs.

7. The circuit according to claim 6, further comprising a state memory acting as a Moore state machine or a Mealy state machine.

8. The circuit according to claim 1, wherein the trigger event comprises at least one of expiration of a period of time indicating that the decrypted information is no longer being used by the plurality of second logic gates and issuance of a command to power off of the circuit.

9. The circuit according to claim 1, wherein the processor is further configured to cause the decrypted look-up table portion to be temporarily stored in the memory device.

10. The circuit according to claim 1, wherein the processor is further configured to cause the decrypted look-up table portion to be downloaded into the first portion of the combinational circuit.

* * * * *